Sept. 12, 1967   W. H. PLUMPE, JR   3,341,758
MOTOR-BRAKING DEVICES
Filed Aug. 10, 1966   2 Sheets-Sheet 1

INVENTOR.
WILLIAM HENRY PLUMPE, JR
BY
Hofgren, Wegner, Allen, Stellman & McCord
ATTORNEYS United States Patent Office 3,341,758
Patented Sept. 12, 1967

3,341,758
MOTOR-BRAKING DEVICES
William Henry Plumpe, Jr., St. Louis, Mo., assignor to Biological Research, Inc., a corporation of Delaware
Filed Aug. 10, 1966, Ser. No. 571,586
13 Claims. (Cl. 318—212)

ABSTRACT OF THE DISCLOSURE

An AC motor braking system in which an SCR is fired to discharge a DC potential across a capacitor through an AC motor winding. A second capacitor, charged to a DC potential, maintains the SCR nonconductive until the AC source voltage to the motor is interrupted. A portion of the AC source voltage is coupled to an SCR bias path for preventing the firing of the SCR on half cycles of undesired polarity.

---

This application is a continuation-in-part of my application Motor-Braking Devices, Ser. No. 319,144, filed Oct. 28, 1963, now abandoned.

This invention relates in general to certain new and useful improvements in motor-braking devices and, more particularly, to electronic braking devices adapted for use with alternating current motors.

Many types of machinery which perform intermittent process operations are driven by electrical motors and the sequence of operations, or programming, of the machine will frequently involve the use of switches that are adapted to turn the motor on or off at frequent intervals during a period of operation. In many machines of this type, it is also essential that the machinery be stopped quickly and precisely, so that there will be no significant over-travel. For example, in machines adapted to cut off short lengths of some predetermined dimension from a continually travelling long section of tubing, pipe or rod-stock, it may be desirable to feed the material in a predetermined direction for a selected distance, and then interrupt the feeding movement while a cut is being made. Inasmuch as the amount of material which is fed in the predetermined direction prior to interruption of the feeding movement is a measure of the length of material which is being cut off, it is, of course, obvious that the precision with which the machine is stopped, is a direct factor in the accuracy or precision which can be maintained in the length of material being cut off. If there is any significant amount of over-travel in the machinery, such over-travel will result in variations in length and have an adverse effect on the process of the operation.

Therefore, it is desirable to employ some kind of braking mechanism so that the machinery will stop almost immediately whenever stoppage is required. Such braking mechanisms, however, are mechanical in operation and rely upon the inter-engagement of two frictional members, such as a brake-drum and brake band, or a clutch disc and clutch plate. This type of braking device, being essentially mechanical, requires some increment of time in which to function and, therefore, has inherent limitations, so far as accuracy and precision are concerned. Moreover, mechanical braking devices wear rather rapidly, and, therefore, require frequent adjustment, maintenance and repair. In addition to this, mechanical braking devices are comparatively large and costly.

There are also many machine-tools such as lathes, for example, which must be stopped repeatedly in the course of a particular operation for successive inspection or measuring of the work. In such cases, present practice is merely to pull the switch and let the machine coast to a stop. Obviously, at machinist rates of pay, this is a very wasteful procedure, especially in the case of large heavy machinery, which has developed considerable momentum and is carefully designed to reduce friction in the bearings. Such machine tools often require a number of minutes to slow down and stop. Thus, when the work must be frequently measured with a micrometer, or other gauge, as is necessary in close tolerance machining, the frequent stops will add a large percentage of useless time to the job. Very few such machine tools have been built with brakes and, therefore, it is highly desirable to provide a braking mechanism which can be easily applied to existing equipment at reasonable cost.

Some motor braking systems have applied direct current across the field winding of an alternating current motor for braking purposes. Any convenient source of direct current may be used for such a purpose. For example, when braking fractional horsepower AC motors, a capacitor previously charged through a diode connected to the AC line may be discharged through the field winding.

Unfortunately, such prior systems have a slow response time which prevents their use in applications where precise stopping is required, such as in the tube cutting machinery discussed above. In accordance with the applicant's invention, an improved motor braking device is disclosed for gating direct current across the field winding of an AC motor. The improved gating circuits have a fast response time, and are adapted to incorporate various special safety circuits and features which are desirable in a versatile control system.

It is, therefore, the primary object of the present invention to provide an electronic braking device which can be applied to or incorporated in electric motors, in which direct current is applied to a field winding for stopping the motor.

It is also another object of the present invention to provide an electronic braking device which can be applied to or incorporated in electric motors for repeatedly stopping such motors rapidly, and with a minimum of lost time.

It is another object of the present invention to provide a braking device of the type stated which is relatively simple in construction and, therefore, economical in initial cost.

It is also an object of the present invention to provide a braking device of the type stated which functions through a minimum of mechanically operated parts or components, is free of wear, thereby eliminating substantially all maintenance and repair costs, and is not subject to ambient conditions such as an explosive atmosphere or a dust-laden atmosphere.

It is a further object of the present invention to provide a braking device of the type stated which is capable of immediate and highly sensitive responsive to control impulses and, therefore, is capable of extremely precise operation.

It is also an object of the present invention to provide a braking device of the type stated which is unusually compact, light-weight, and, if desired, can be easily applied to an existing motor which either does not have some form of braking device or in which the braking device is not satisfactory.

It is another object of the present invention to provide a braking circuit for an AC motor, using a switching device for gating direct current across an AC motor, under control of a signal which is generated by the circuit. This signal may be generated automatically when the flow of alternating current across the field winding is interrupted, or in response to a condition occurring after the interruption of the alternating current flow. Furthermore, the control circuit, may, if desired, prevent the application of direct current across the field winding except during certain half cycles of the alternating current.

With the above and other objects in view, my invention resides in the novel features of form, construction, arrangement, and combination of parts presently described and pointed out in the claims.

Figure 1:
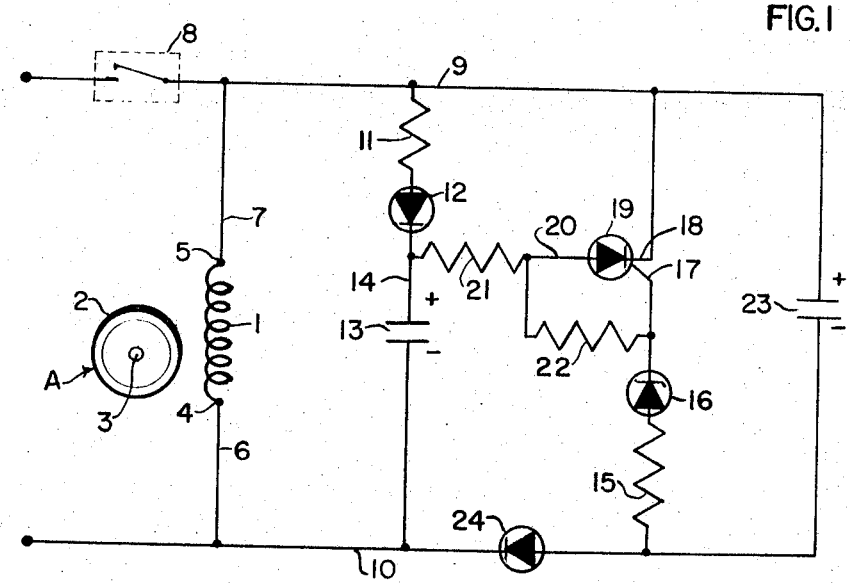
FIG. 1 is a schematic wiring diagram of an electronic braking device constructed with, and in accordance with, and embodying the present invention.

While illustrative embodiments of the invention are shown in the drawings and will be described in detail herein, the invention is susceptible of embodiment in several different forms and it should be understood that the present disclosure is to be considered as an exemplification of the principles of the invention and is not intended to limit the invention to the embodiments illustrated. Throughout the specification, values and type designations will be given in order to disclose a complete, operative embodiment of the invention. However, these values and type designations are not critical and are only given as illustrative.

Referring now in more detail and by reference characters to the drawings, which illustrate practical embodiments of the present invention, A designates an AC motor having a field winding 1, a rotor 2 and a drive shaft 3. The field winding 1 has terminals 4, 5 which are electrically connected through conductors 6, 7, and a conventional switch 8 to AC supply lines 9, 10, which are, in turn, connected through conventional conductors (not shown) to a conventional source of alternating current. For convenience of illustration, the switch 8 for interrupting the flow of alternating current across the field winding is shown as being interposed in the supply line 9.

Connected in series across the AC supply lines 9, 10, is a 20 ohm surge limiting resistor 11, a 1N3195 diode 12, and a 200 microfarad capacitor 13, the diode 12 and capacitor 13 being connected by a conductor 14. Similarly connected in series across the supply lines 9, 10, is a 560 ohm resistor 15, a Zener diode 16, the control or gate electrode 17, and the cathode electrode 18 of a silicon controlled rectifier (SCR) 19. The anode 20 of SCR19 is connected through a 15 ohm surge limiting resistor 21 to the conductor 14. A 25 kilohm bias resistor 22 connects the DC source formed from capacitor 13 to the gate electrode 17 of the SCR, by shunting the gate 17 and the anode 20 of the SCR19. An SCR requires, as is well known, a positive signal on gate 17 relative to cathode 18 in order to switch from its normally nonconductive state between cathode 18 and anode 20, to its conductive state therebetween.

A 10 microfarad capacitor 23 is connected across the conductors 9, 10 as substantially shown in FIG. 1. An auxiliary diode 24, similar to diode 12, is interposed in the line 10 between the resistor 15 and the capacitor 13. The polarities of the capacitors 13 and 23, as shown in FIG. 1 are, of course, the result of the directions in which the diodes 12 and 24 are connected.

Assuming, that a main switch (not shown) is closed, so that the lines 9, 10 are live, and that the switch 8 is also closed, the motor A will be energized and the drive shaft 3 will rotate. At the same time, capacitors 13 and 23 will be fully charged by the unidirectional flow of current through the diodes 12 and 24 associated therewith. The voltage across lines 9 and 10 is also sufficient to break-over Zener diode 16, causing a current to flow through resistor 11, diode 12, resistors 21 and 22, Zener diode 16, resistor 15, and diode 24 to line 10. The negative charge on the bottom plate of capacitor 23 is connected through resistor 15 and conducting Zener diode 16 to the gate 17 of SCR19, thereby supplying a negative or cut-off bias which overrides the positive bias from capacitor 13, which was dropped across the higher resistance of resistors 21 and 22.

When the AC current is shut off by reason of the opening of the switch 8, a discharge path across capacitor 23, formed through resistor 11, diode 12, resistors 21, 22, Zener diode 16, and resistor 15, is now effective to quickly discharge the voltage accumulated thereacross. Prior to the opening of switch 8, the discharge path, although coupled across capacitor 23, had not been effective because the supply current was applied directly across capacitor 23 through diode 24, thus maintaining it fully charged. As the voltage in the discharge path drops below the break-over voltage of Zener diode 16, the Zener becomes nonconductive, thereby open circuiting the discharge path and removing the negative bias applied to gate 17. The voltage at gate 17 now jumps to the positive value coupled through resistors 21, 22. This change in voltage level appears to SCR19 as positive impulse signal which switches the SCR into its conducting state, causing capacitor 13 to discharge its accumulated charge through the field winding 1 of motor A. As is well known, when a previously charged capacitor is discharged through the field winding of an AC motor, the resulting DC current flow stops the motor almost immediately. This can be done because such motors can be momentarily overloaded for a few milliseconds, and therefore a relatively high-amperage DC current can flow without damage to the motor.

The discharge path across capacitor 23 would, by itself, dissipate the negative bias of capacitor 23 sufficiently to have the positive potential from capacitor 13 override the blocking bias, thus forward biasing the gate 17 of SCR19. However, by inserting Zener diode 16 in the discharge path, the negative bias is removed sooner than would be possible if a purely resistive path were formed. That is, Zener diode 16 open circuits after a predetermined amount of charge has been dissipated, which charge is less than the amount otherwise needed to forward bias the SCR. Of course, Zener diode 16 could be replaced by any semiconductor junction requiring a break-over voltage for conduction. By selection of different values of the resistor 15 and capacitor 23, it is possible to introduce a time-lag of almost any desirable duration between the opening of the switch 8 and the firing of the SCR19.

Figure 2:
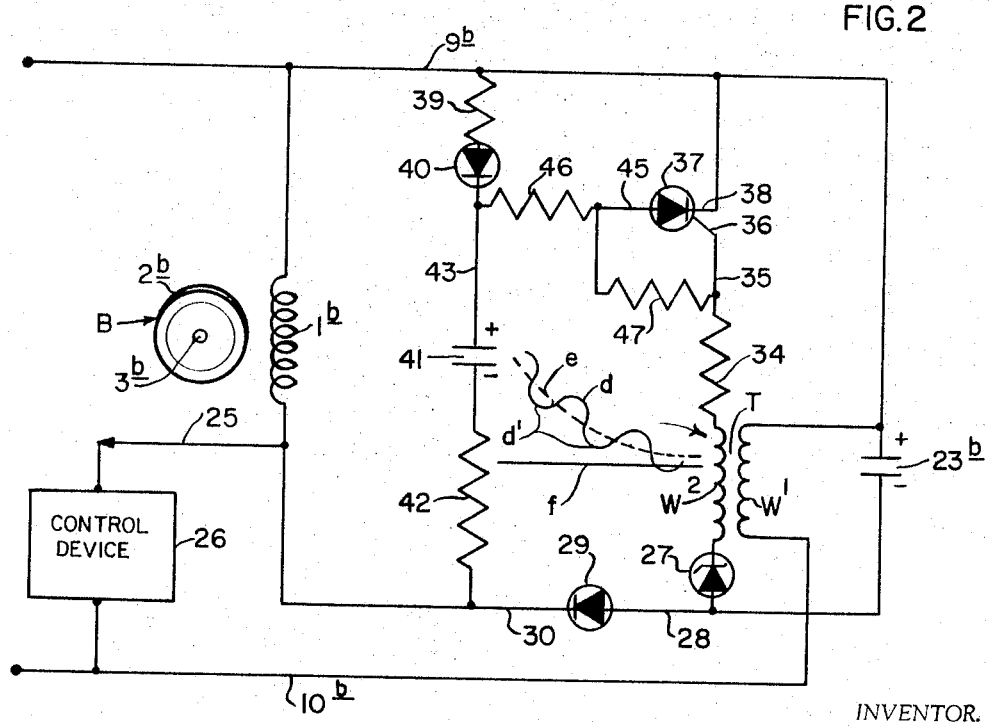
FIG. 2 is a schematic wiring diagram of a modified form of electronic braking device constructed with, and in accordance with, and embodying the present invention.

In FIG. 2, a modified form of the invention is shown in which the SCR is fired only on the particular half cycle of the AC source which prevents the voltage from the discharging capacitor from adding with the line voltage to produce an excessive value across the opened line switch. This circuit uses an electric motor B, which is substantially identical with the previously described electric motor A, and includes a field winding 1$^b$, a rotor 2$^b$, and a drive shaft 3$^b$. In this embodiment of the present invention, one terminal of the field winding 1$^b$ is connected to a conductor 9$^b$ which in turn is connected to one terminal of an AC current source (not shown). The circuit also includes a conductor 10$^b$ which is connected to the other terminal of the AC source. The other terminal of the field winding 1$^b$ is coupled to conductor 10$^b$ through a conductor 25 and a control device 26 which can be mechanical or electrical as circumstances require. The control device 26 does not constitute any part of the present invention and is, therefore, not shown or described in detail herein. It is sufficient for present purposes to point out that the control device 26 serves as a means for interrupting the AC flow to the motor B at some selected moment in a process-operation or upon receiving some suitably generated external signal.

Connected across the conductors $9^b$, $10^b$ is a primary winding $W^1$ of a step-down transformer T, which also includes a low voltage secondary winding $W^2$. One terminal of $W^2$ is connected in series through a Zener diode 27 to a conductor 28, which is, in turn, connected through a diode 29 to a conductor 30, the latter being connected to the control device 26. The other terminal of the secondary winding $W^2$ is connected in series through a resistor 34 and conductor 35 to the gate electrode 36 of a SCR37. The cathode electrode 38 of the SCR37 is connected directly to conductor $9^b$. Also connected in series between the conductor $9^b$ and the conductor 30 is a surge-limiting resistor 39, a diode 40, a capacitor 41 and a surge-limiting resistor 42, the diode 40 and capacitor 41 being connected by a conductor 43. The anode electrode 45 of SCR37 is connected through a surge-limiting resistor 46 to the conductor 43. The gate 36 and anode 45 of the SCR are also connected through a bias resistor 47. Finally, a capacitor $23^b$ is connected between the conductor $9^b$ and the anode of the diode 29. The capacitor $23^b$ serves substantially the same function as the capacitor 23 in the embodiment shown in FIG. 1.

This circuit, as shown in FIG. 2, operates substantially in the same manner as the previously described circuit shown in FIG. 1, with the exception of transformer T. That is, control device 26 serves as the switch 8 of FIG. 1, for interrupting the supply of AC current across conductors $9^b$ and 30. Resistor 42 is merely another surge-limiting resistor, which if desired may be eliminated. It will, of course, be apparent that transformer T is always connected across the AC source, regardless of the condition of controlled device 26. This transformer keeps the firing of SCR37 synchronized with a particular one of the half cycles of the AC supply, that is, it prevents the firing of the SCR on the opposite half-cycle of the AC supply. This is desirable as a manner of protection for the control circuitry which may be used in the control device 26. It is very likely that such control circuitry, for reasons of economy or convenience, may contain components which have a break-down voltage only slightly higher than the peak line voltage. In such situations, it is conceivable that the capacitor 41 could be discharged coincidently with a positive peak on line $10^b$, in which case the sum of the voltages resulting from the AC supply and the voltage from capacitor 41 would momentarily add across device 26 to an excessive value and some of the components in the control device 26 could therefore break down. The circuitry of the braking device shown in FIG. 2, however, prevents this accidental occurrence by assuring that the SCR will fire only on the opposite half-cycle on line $10^b$, that is, when line $10^b$ is negative relative to line $9^b$.

For this purpose, secondary $W^2$ develops an AC voltage, labeled $d$ in FIG. 2 and shown with reference to line 28, which is very much lower than the voltage across the capacitor $23^b$. This voltage has a negative going portion $d'$ when the half-cycle of AC on line $10^b$ goes negative. When the discharge path is effective to dissipate the voltage on capacitor $23^b$, the total voltage imposed across the gate 36 and cathode 38 is the sum of a decaying DC voltage $e$ from capacitor $23^b$, indicated by dashed lines, with the AC voltage $d$ superimposed thereon. Consequently, as the charge on capacitor $23^b$ decays, it is apparent that the total voltage in the discharge circuit will always first fall below the break-over voltage $f$ of Zener diode 27 when the AC component is going negative. Thus, during one of the half-cycles $d'$ Zener diode 27 will stop conducting, thereby firing the SCR as previously described for FIG. 1. Since the half-cycle $d'$ can be made to correspond with either a positive or negative half-cycle on line $9^b$, by reversing the leads on transformer T, the SCR can be made to fire only when a desired half-cycle is present.

Of course, Zener diode 27 could be eliminated from the circuit, as described for FIG. 1. In such a case, level $f$ would correspond with the predetermined amount of discharge of capacitor $23^b$ which allows the positive voltage from capacitor 41 to override the negative bias on gate 36, thus firing the SCR.

Figure 3:
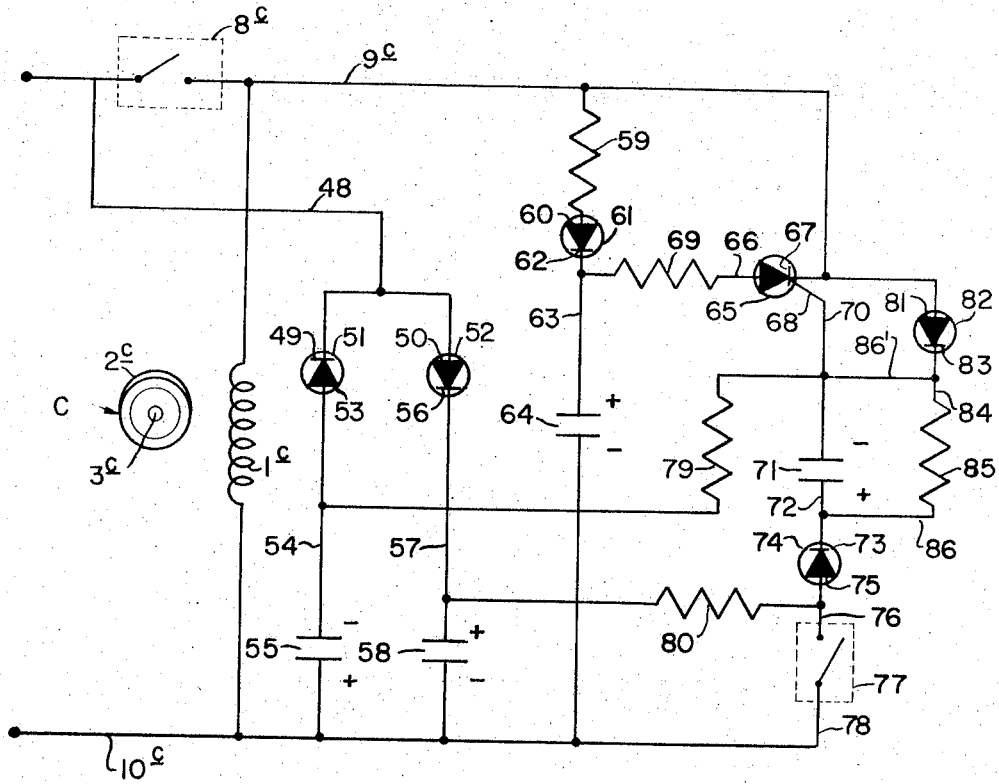
FIG. 3 is a schematic wiring diagram of another modified form of electronic braking device constructed with, and in accordance with, and embodying the present invention.

In FIG. 3, a modified form of the invention is shown in which the motor is stopped at a desired time occurring shortly after the AC is disconnected from the motor. This circuit shown in FIG. 1 and is adapted for use with an AC motor C having a field winding $1^c$, a rotor $2^c$, and a shaft $3^c$. In this embodiment of the present invention, one terminal of the field winding $1^c$ is connected to a conductor $9^c$ which is, in turn, connected through the switch $8^c$ to one terminal of an AC source (not shown). The circuit also includes a conductor $10^c$ which is connected to the other terminal of the AC source.

For clarity of illustration, the switch $8^c$ is shown as a simple hand-operated switch, but, it should be understood that control device, such as the control device 26, can be substituted for the switch $8^c$ whereby the AC current to the motor C is interrupted in response to some remote generated electrical signal or remote initiated mechanical movement.

Connected to the "hot" side of the switch $8^c$ is a conductor 48, which is branched and is connected to the cathode 49 and anode 50 of 1N3195 diodes 51, 52 respectively. The anode 53 of diode 51 is connected by a conductor 54 to the plate of a 20 microfarad capacitor 55, the other plate of which is connected to conductor $10^c$. The cathode 56 of diode 50 is connected by a conductor 57 to a plate of another 20 microfarad capacitor 58, the other plate of which is connected directly to the conductor $10^c$. Since capacitors 55 and 58 are always connected across the AC source, they are charged through the diode associated therewith to the potential indicated on the diagram. Thus, line 54 forms a negative DC source and line 57 forms a positive DC source relative to line $10^c$.

Connected at one end directly to conductor $9^c$ is a 20 ohm surge limiting resistor 59 which is also connected at its other end to the anode 60 of a 1N3195 diode 61. The cathode 62 of the diode 61 is connected by a conductor 63 to the plate of a 200 microfarad capacitor 64, the other plate of which is connected directly to the line $10^c$. The circuit also includes an SCR65 having an anode electrode 66, a cathode electrode 67, and a gate electrode 68. The anode 66 is connected through a 15 ohm resistor 69 to the conductor 63. The cathode 67 is connected directly to the conductor $9^c$. Capacitor 64 charges in the same manner as capacitor 13 in FIG. 1, and is similarly discharged through the SCR65, corresponding to SCR19 in FIG. 1, across the field winding when a signal is coupled to the gate electrode.

The gate 68 is connected by a conductor 70 to a plate of a 1 microfarad capacitor 71, the opposite plate of which is connected by a conductor 72 to the cathode 73 of a 1N3195 diode 74. The anode 75 of the diode 74 is connected by a conductor 76 to one side of a switch 77, the other side of which is connected by a conductor 78 to the conductor $10^c$. Interposed between the negative conductor 54 and the conductor 70 is a 10 kilohm resistor 79. Similarly interposed between the positive conductor 57 and the conductor 76 is a 7.5 kilohm resistor 80. The cathode 67 of SCR65 is connected to the anode 81 of a 1N3195 diode 82, having a cathode 83 which is connected by a conductor 84 to one end of a 56 kilohm resistor 85, the other end of which is connected through a conductor 86 to the conductor 72. The conductor 84 is also cross-connected by a conductor 86' to the conductor 70. Capacitor 71 and resistor 85 form a pulse shaping network. Diode 82 is connected across the SCR in a conventional manner to prevent excessive negative gate voltage from being applied across the gate-cathode electrodes.

The electronic braking device shown in FIG. 3 functions basically in the same manner as the previously described embodiments, but the manner of firing the SCR is different, making the circuit particularly well suited for applications where precise stopping of process machinery is required, such as would be true in a cut-off machine, for example. The alternating current charges capacitors 55 and 58 at all times, maintaining a negative potential on line 54 and a positive potential on line 57. The negative potential on line 54 is coupled through resistor 79 to gate 68 for maintaining the SCR nonconductive. When the switch 8ᶜ is opened, the field winding 1ᶜ of the motor C becomes deenergized and the rotor 2ᶜ starts coasting to a stop. Thereafter, at some selected moment in the operation cycle of the machinery being driven by the motor C, the switch 77 is opened to the position shown in FIG. 3. This switch, when closed, had shorted the junction of diode 73 and resistor 80 to the reference line 10ᶜ. Since diode 73 is poled to pass current from capacitor 55, capacitor 71 was charged while switch 77 was closed. When switch 77 is now opened, diode 73 is connected through resistor 80 to the positive line 57 from capacitor 58, causing a positive signal pulse to pass to gate 68, thereby firing the SCR. The DC charge accumulated in capacitor 64 is now discharged through the field winding 1ᶜ, substantially as described before, bringing the motor C to a precise stop.

Figure 4:
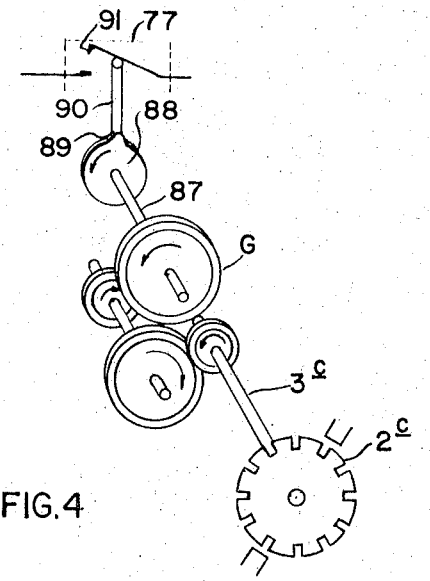
FIG. 4 is a schematic perspective view illustrating one form of mechanical component with which a motor braking system of the present invention can be used.

Thus, in the circuit shown in FIG. 3, the switch 8ᶜ is opened in preparation for a stop, and the rotor 2ᶜ is thereafter brought to a stop very quickly and precisely at any selected position by opening switch 77. In actual practice, the drive shaft 3ᶜ will ordinarily be connected to a conventional speed reduction gear train, such as that schematically shown at G in FIG. 4. This gear train G will include an output shaft 87 which is ultimately connected in some simple mechanical manner to the machinery which is being driven by the motor C, and mounted upon such output shaft 87 is a cam 88 having a lobe 89. The cam 88 bears operatively against one end of an actuator rod 90, which is operatively connected to the blade 91 of the switch 77. Thus, when the lobe 89 lifts the actuator rod 90, the blade switch 91 will be shifted to its open circuit position. If, for example, the gear ratio of the gear-train G is 30 to 1, then an arcuate movement of 30° in the rotor 2ᶜ will actually only amount to one degree of arcuate movement of the shaft 87, so that the possible error will always be substantially less than one percent. The cam 88 merely represents one preferred mechanism by which the switch 77 can be opened at some selected moment in the operation cycle of the machinery being driven by motor C. Any other equivalent mechanism for opening the switch 77 can also be employed.

It should be understood that changes and modifications in the form, construction, arrangement, and combination of the several parts of the motor-braking devices may be made and substituted for those herein shown and described without departing from the nature and principle of my invention as hereinafter claimed.

I claim:

1. A braking circuit for use with an alternating current motor, comprising: a source of alternating current connected across the motor, means for interrupting the flow of alternating current from said source to said motor, a source of direct current, a switching device including first and second electrodes having conductive and nonconductive states therebetween under control of a signal at a control electrode, means connecting said direct current source and said first and second electrodes in series across said motor, bias means for producing said signal during the time the flow of alternating current is interrupted, and means connecting said control electrode to said bias means, said bias means including a capacitor charged to a direct current potential for biasing said device in its nonconductive state, and a discharge path effective when said interrupting means stops the flow of alternating current to said motor to discharge the direct current potential across said capacitor by a predetermined amount, the predetermined amount of discharge causing said signal to be produced, thereby switching said device.

2. The circuit of claim 1 including means coupling said direct current source to said control electrode for supplying said signal thereto when said capacitor is discharged said predetermined amount.

3. The circuit of claim 1 including a semiconductor junction requiring a break-over voltage for conduction, and means connecting said junction in series with said discharge path to cause the potential on said junction to fall below said break-over voltage when the capacitor discharges said predetermined amount, thereby open circuiting said discharge path to remove the biasing effect of said capacitor.

4. The circuit of claim 1 wherein said alternating current from said source has alternate half-cycles, and means coupling said alternating current in circuit with said discharge path to produce a decaying waveform having an alternating component in phase with said half-cycles, said alternating component allowing said device to be switched to said conductive state during only one of said half-cycles.

5. A braking circuit for use with an alternating current motor, comprising: a source of alternating current connected across the motor, means for interrupting the flow of alternating current from said source to said motor, a source of direct current, a switching device including first and second electrodes having conductive and nonconductive states therebetween under control of a signal at a control electrode, means connecting said direct current source and said first and second electrodes in series across said motor, and bias means for producing said signal during the time the flow of alternating current is interrupted, including a switch actuated to produce said signal after said interrupting means stops the flow of alternating current to said motor, a source of DC potential of one polarity coupled to said control electrode for biasing said device in said nonconductive state and a source of DC potential of opposite polarity, and means effectively connecting said opposite polarity DC source to said control electrode when said switch is actuated, thereby switching said device to said conductive state.

6. The circuit of claim 5 wherein the connecting means for said opposite polarity DC source includes a capacitor having one side connected to said control electrode and the other side connected to a reference line through said switch when closed, the opening of said switch effectively connecting said other side of said capacitor to said opposite polarity DC source, producing a signal pulse for switching said device into conduction.

7. A braking device for use with an alternating current motor, said device comprising: a source of alternating current to supply power to the motor, means for interrupting the flow of alternating current to the motor, a source of direct current, and a silicon controlled rectifier biased off by a capacitor as long as the alternating current is supplied to the motor and responsive to interruption of the flow of alternating current to said motor for causing a direct current impulse to flow from the direct current source to the motor, thereby causing the motor to stop.

8. A braking device for use with an alternating current motor, said device comprising a pair of conductors connected at one end to a source of alternating current and at the other end across the motor, switching means interposed in one of said conductors for optionally interrupting the flow of alternating current to said motor, a capacitor and diode connected in series across said conductors in parallel with the motor, a controlled rectifier connected between the capacitor and one of the conductors so as to bypass the diode, and gate-biasing means including said capacitor for firing the controlled rectifier into a conductive state when the alternating current is interrupted to the motor.

9. A braking device for use with an alternating current motor, said device comprising a pair of conductors connected at one end to a source of alternating current and at the other end across the motor, switching means interposed in one of said conductors for optionally interrupting the flow of alternating current to said motor, a capacitor and diode connected in series across said conductors in parallel with the motor, a silicon controlled rectifier connected between the capacitor and one of the conductors so as to bypass the diode, gate-biasing means for holding the silicon controlled rectifier in a nonconductive state as long as the alternating current is supplied to the motor, a step-down transformer having a primary connected across the conductors, and a secondary connected in series with the gate biasing means.

10. A braking device for use with an alternating current motor, said device comprising a pair of conductors connected at one end to a source of alternating current and at the other end across the motor, switching means interposed in one of said conductors for optionally interrupting the flow of alternating current to said motor, a capacitor and diode connected in series across said conductors in parallel with the motor, a silicon controlled rectifier connected between the capacitor and one of the conductors so as to bypass the diode, gate-biasing means for holding the silicon controlled rectifier in a nonconductive state as long as the alternating current is supplied to the motor, a second capacitor, a second diode, and a secondary switch connected in series.

11. A braking device according to claim 10 further characterized by an auxiliary rectifier network connected to the source of alternating current for supplying direct current to the second capacitor whereby to charge said second capacitor.

12. A braking circuit for use with an AC motor, comprising: a source of AC connected across the motor, said AC having alternating positive polarity and negative polarity half cycles; means for interrupting the flow of AC from said AC source to said motor; a source of DC; a switching device including first and second electrodes in series with said DC source and said motor; firing means for switching said device to a conductive state during the time the flow of AC is interrupted; means for maintaining a signal related in phase to said AC during the time the flow of AC is interrupted; and means responsive to said phase related signal for allowing said device to be switched to said conductive state only during the occurrence of half cycles at said AC source of the same polarity.

13. The circuit of claim 12 wherein said firing means includes an electrical path responsive to a predetermined potential thereon for switching said device to said conductive state, and said means responsive to said phase related signal couples said phase related signal to said electrical path for varying the potential of said electrical path in proportion to the phase of the AC from said AC source.

References Cited
UNITED STATES PATENTS

| | | | |
|---|---|---|---|
| 1,911,356 | 5/1933 | Eames | 318—212 |
| 2,411,051 | 11/1946 | Mesh | 318—211 X |
| 2,428,390 | 10/1947 | Smith | 320—1 |
| 2,445,430 | 7/1948 | Herchenroeder et al. | 318—212 |
| 2,445,806 | 7/1948 | Snyder | 318—212 |
| 2,512,354 | 6/1950 | Marbury | 318—212 |

ORIS L. RADER, *Primary Examiner.*

G. Z. RUBINSON, *Assistant Examiner.*

UNITED STATES PATENT OFFICE
CERTIFICATE OF CORRECTION

Patent No. 3,341,758                            September 12, 1967

William Henry Plumpe, Jr.

It is hereby certified that error appears in the above numbered patent requiring correction and that the said Letters Patent should read as corrected below.

In the heading to the printed specification, lines 3 and 4, for "assignor to Biological Research, Inc., a corporation of Delaware" read -- assignor, by mesne assignments, to Brunswick Corporation, Chicago, Ill., a corporation of Delaware --.

Signed and sealed this 1st day of October 1968.

(SEAL)
Attest:

Edward M. Fletcher, Jr.                        EDWARD J. BRENNER

Attesting Officer                              Commissioner of Patents